May 22, 1934.  A. M. HIRSH  1,959,532
METHOD AND MEANS FOR LEAKPROOFING PIPE JOINTS
Filed March 12, 1932

INVENTOR
Allan M. Hirsh
BY
Cooper, Kerr & Dunham
ATTORNEYS

Patented May 22, 1934

1,959,532

UNITED STATES PATENT OFFICE 1,959,532

METHOD AND MEANS FOR LEAKPROOFING PIPE JOINTS

Allan M. Hirsh, Montclair, N. J., assignor to Lock Joint Pipe Company, East Orange, N. J., a corporation of New Jersey Application March 12, 1932, Serial No. 598,312

3 Claims. (Cl. 285—111)

This invention relates to joints between pipe sections and, more particularly, to methods and means of leak proofing such joints against the passage of liquid which might otherwise occur because of failure of the jointing material or the parting of the bond between the jointing material and the pipe sections.

While there are many methods of connecting pipe sections, few, if any, joints may be fully guaranteed against leakage for a prolonged period of time and under all possible conditions. Some joints are packed with hemp and sealed with lead, and filling material containing cement is also used in conjunction with such materials and as the only filler of the space between the united end portions of pipe sections. For simple pipe installations where the pipe is small and well protected and the work of assembling the same has been well done, there may never be any fear of leakage because of failure at the joints, but large sectional pipe presents more difficulties. Pipes of large capacity are frequently laid in the ground and used to carry liquids for many miles. A leaking joint is difficult to find and if it is not repaired soon enough a blow out may occur entailing much expense for its repair.

No matter how carefully sectional pipe may be joined together, there are forces, such as the settling of surrounding earth, nearby explosions, earth tremors, and temperature change, beyond the control of man, which may cause failure of joints. Added to these hazards there is always the possibility that workmen may have been delinquent—a particular joint may not have been packed thoroughly or its jointing material may have included a poor grade of substance or may have been improperly mixed. Oftentimes the loss of material in transit through a pipe line is observed, but, although a leaking joint may be suspected, it usually is not an easy matter to locate the disorder. In most cases much expense is involved.

Among the objects of my invention is to make joints leaf proof to avoid the loss of fluid substances and the heavy expense incident to finding and repairing leaking joints, and, accordingly, I have been led to devise the novel methods and joint seals to be described herein. Other and incidental objects of my invention will appear in the specification and in the claims thereof.

In the drawing I have illustrated a few samples of joints commonly used and the method of leak proofing such joints.

While I have illustrated by way of example, only a limited number of well-known types of joints used for connecting pipe sections, I wish it to be understood that my invention is applicable for use with any kind of a joint which is likely to develop a leak, either because of the cracking or breaking down of jointing material, or because of the failure of the bond between the jointing material and the pipe surface to which it initially adhered. I have found that leaks, because of these reasons, may be effectively prevented by the use of a finely divided material which is so placed that the water or other liquid leaking through the joint will carry the material and cause the same to fill such cracks as have occurred. The leak stopping material should be of such a nature and reduced to such a state that it will readily be distributed by water or any other liquid being carried in the pipe line. I prefer to use materials of a fibrous character which will tend to catch upon the relatively rough surfaces defining a crack. Its function is to pack itself in such a manner as to fill a crack and form a barrier against the further passage of liquid. Among the materials which are useful I have found that very finely divided wood fibre is very satisfactory, but materials having similar properties and a specific weight less than that of water or other liquid to be stopped, are also useful. Such materials may include beaten felt, paper, hemp fibres or dust, cellulose, cotton-seed hulls, and straw, all finely divided into small particles.

Figure 1:
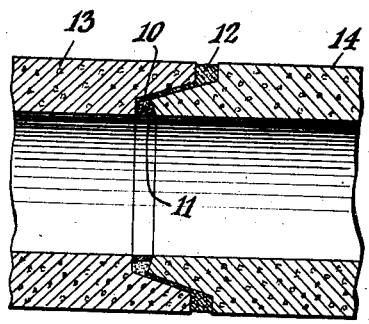
Fig. 1 is a longitudinal section through the axis of two connected pipe sections of a common variety of concrete pipe.

The materials should be placed somewhere in the joint between the inner surface and the outer surface of the pipe and protected from the liquid carried in the pipe by some variety of the commonly used jointing materials. For example, in Fig. 1 I have illustrated a common form of joint in which the finely divided material 10 forms a ring embedded within jointing material at 11 and 12. The finely divided material 10 may be placed in position just before the two sections of pipes 13, 14 are joined together, or if the size of the pipe permits, the finely divided material may be placed in position from the interior of the pipe after the sections have been joined. The jointing material which is inside of the pipe is bonded to the opposite end portions of the two sections and effectively prevents access of water to the finely divided material so long as the joint remains undisturbed and in its normal condition. The jointing material 12, as well as that within the pipe at 11, performs the usual service of reinforcing and sealing the joint. If some injury should occur to the joint which would result in the breaking of the bond between the jointing material 11 and the end portion of a pipe section, water seeping through the fissure or crack formed would come into contact with the finely divided material and carry it along its path of travel. The material being of a fibrous and matting character is snared by the irregularity of the relatively rough surfaces and builds up a barrier which effectively prevents the further flow of liquid. Where the occasion permits, the finely divided material may be placed in position in a dry or powdered form, but those who prefer may apply it by the use of a carrier with which it may be mixed and formed into a paste of such consistency that will permit trowelling or pumping into place. A paste containing an inert powder and water will maintain wood fiber or other leak stopping material uniformly distributed in a fluid state. Suitable carriers may be made by the use of inert powders such as precipitated chalk, burnt gypsum, kaolin and calcined magnesite. Also, any substance which would be soluble in water or in the liquid intended to be carried by the pipe would be useful as a carrier, as, for example, some forms of glue or soluble gels. The carrier substance should be of such a nature that it will not impair the release of the fibres of the finely divided material constituting the leak stopping material which is to be carried by the leaking water into the crevices which are to be stopped up.

Another manner of handling and applying leak stopping material is to place the same within a casing constituting a tubular member or fold made of a material which will readily release the stopping material when wetted. A sleeve of "cellutextile" material is satisfactory for this purpose since there is considerable reduction in the fiber of such material when immersed in water. Ordinary open-mesh fabrics treated with sizing to fill the meshes may also be used to advantage but the mesh should not be so fine as to prevent the release of the leak stopping material when the leaking water washes out the sizing.

Convenient lengths of casings filled with wood fiber or other leak stopping material may be packed in containers and shipped as wanted on various jobs. Workmen may then cut the sleeves into the lengths desired and place the same into joints. By minimizing the handling necessary, loss of leak stopping material through the meshes of a textile material will be avoided. The ends of the casing may be closed as illustrated at 15 in Fig. 7 and similar restrictions may be made at various lengths, say for every two or four feet, to produce a member resembling a string of sausages, but it will be understood that the form of the casing is adaptable for the particular job and, in fact need not be made up until ready for insertion in a joint.

The invention, however, practiced, is applicable for use with practically any kind of a pipe joint in which jointing material may be used. By jointing material I mean cement, cement mortar, plaster, lead, hemp and other materials which may be used for filling a joint. It do not wish to be limited to any particular kind of jointing material, for it is apparent that the choice of such material is dependent upon the kind of joint and the material of the pipe and the size and use to which the pipe is to be put.

Figure 2:
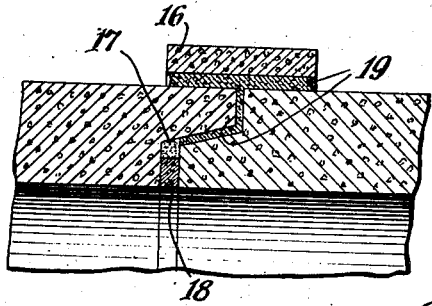
Fig. 2 is a longitudinal section through a portion of the walls of two connected pipe sections having a ring about the joint.

In Fig. 2 I have shown a portion of a joint with which a collar 16 is used. The leak stopping material 17 is embedded within jointing material 18, 19 and lies in the path of any liquid leaving the inside of the pipe through the joint. Owing to the position of material 17 it will clog any crack which might develop in or about the jointing material 19 or in or about the jointing material between the collar 16 and the outside of the pipe sections.

Figure 3:
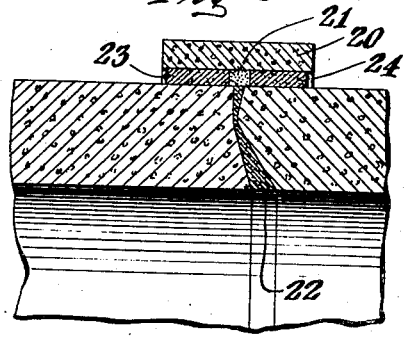
Fig. 3 shows a portion of another form of joint and the manner of rendering the joint leakproof.

Fig. 3 shows a portion of another form of pipe joint having a collar 20. For this joint the leak stopping material 21 may be applied from the outside of the pipe after the collar has been placed in position. The joint is sealed as usual by jointing material 22. After the jointing material 23 has been placed in position, the material 21 may be applied in such a manner as to be in the path of any liquid going in either direction along the outside of the pipe. It is then sealed in place by jointing material 24.

Figure 4:
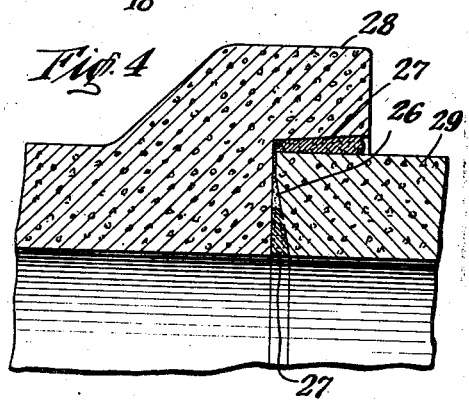
Fig. 4 is a longitudinal section through a portion of still another joint, showing the method of leakproofing the joint.
Figure 5:
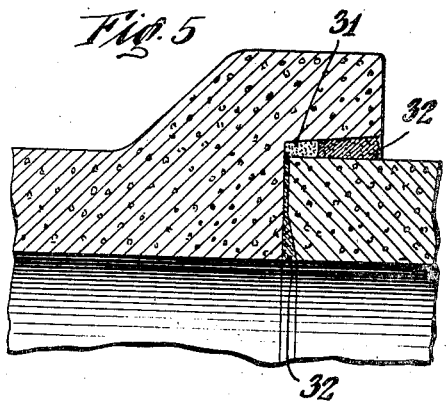
Fig. 5 is a longitudinal section through a portion of a joint similar to that illustrated in Fig. 4, showing another method of leak-proofing a similar joint.

In Figs. 4 and 5, I have illustrated two similar forms of pipe joints and in the joint shown in Fig. 4, the leak stopping material 26 has been placed in position from the inside of the pipe and then sealed by jointing material 27. The jointing material between the spigot 28 and the bell 29 may be applied as is usual from the outside of the pipe. For leak-proofing of the joint illustrated in Fig. 5 the leak stopping material 31 may be applied from the outside of the pipe after the two pipes have been joined and the jointing material 32 is in place.

Figure 6:
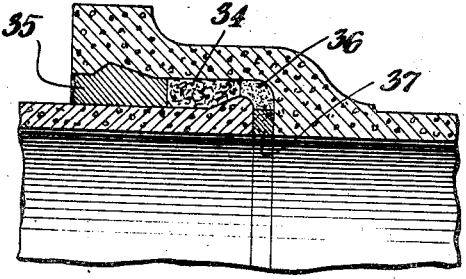
Fig. 6 is a longitudinal section through a portion of a joint between connected metallic pipes and showing the manner in which such a joint may be rendered leak-proof.

In Fig. 6 I have illustrated a portion of a joint which is commonly used for metallic pipes. With this kind of a joint, it is common practice to use hemp 34 which is sealed by a ring of lead at 35. In order to prevent the leakage of liquid through the joint, I apply the leak stopping material at 36 and seal this material from the interior of the pipe by jointing material at 37. As in the case of concrete pipes and in the use of cement or cement mortar as the sole jointing material, the leak stopping material at 36 will be carried along with any current of liquid that may develop and it will stop leakage through the hemp and along the facing end portions of the pipe sections.

Figure 7:
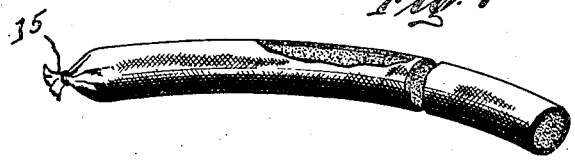
Fig. 7 shows a portion of a casing of open mesh material containing leak-stopping material.

In the short descriptions of the several joints shown in the drawing, I have not made particular reference to the application of leak preventing material by means of a casing as illustrated in Fig. 7, but I wish it to be understood that in each instance the leak preventing material may be applied dry, in a paste or by means of a casing.

I contemplate leak-proofing of all joints at the time the pipe line is initially laid, so as to obviate all the trouble and expense incident to leaking joints. I have found, however, that my invention is applicable for stopping leaks in joints which have not been leak-proofed before laying, and I have obtained excellent results by drilling a hole into a joint and pumping a plastic mixture of wood dust and hydrated lime into the joint. The hydrated lime served as a carrier for distributing the particles of wood within the crack, and the water leaking from the joint leached out the lime and distributed the particles of wood along the crack or cracks. The matting and packing of the particles of wood served to effectively clog the crack or cracks which had been leaking. Other substances such as the inert powders I have mentioned hereinbefore are also useful as carriers.

I claim:

1. In combination, connecting pipe sections with joined ends, a joint at the joined ends comprising jointing material about the joint and contacting with the oppositely disposed surfaces of the ends of the connecting pipe sections, said jointing material being impervious to the passage of liquid therethrough and normally sealing the joint against leakage, and fibrous material in a free state within an annular recess walled by said jointing material, said jointing material maintaining the fibrous material available for rendering the joint leak-proof in the event of failure of the joint, but at the same time protecting the same from access by liquid from within the pipe sections so long as the joint remains secure against leakage.

2. In combination, connecting pipe sections with joined ends, a joint at the joined ends comprising an outer sealing element, an inner sealing element, both of said sealing elements being of such character as to normally prevent access of liquid to an annular recess between the sealing elements while the pipe is in use, and a quantity of fibrous particles within said annular recess and normally maintained inaccessible from liquid outside of the joint by the sealing elements, said fibrous particles being loosely associated and available to be carried by liquid into sealing co-operation with the outer element to effect a seal therewith upon the occurrence of a leak in the joint.

3. In combination, connecting pipe sections with joined ends, a joint at the joined ends comprising jointing material sealing the outer portion of the joint, leak-stopping material in the form of finely divided wood fibres retained within the joint by said jointing material, and jointing material closing off the space occupied by said leak-stopping material and preventing access of liquid thereto from within the pipe sections so long as no rupture of the jointing material occurs.

ALLAN M. HIRSH.